(12) United States Patent
Wadekar

(10) Patent No.: US 8,732,576 B2
(45) Date of Patent: May 20, 2014

(54) OPERATING SYSTEM PROVIDING MULTI-TOUCH SUPPORT FOR APPLICATIONS IN A MOBILE DEVICE

(75) Inventor: Varun Vishwas Wadekar, Kolkata (IN)

(73) Assignee: Nvidia Corporation, Santa Clara, CA (US)

( * ) Notice: Subject to any disclaimer, the term of this patent is extended or adjusted under 35 U.S.C. 154(b) by 496 days.

(21) Appl. No.: 12/328,754

(22) Filed: Dec. 4, 2008

(65) Prior Publication Data
US 2010/0146458 A1    Jun. 10, 2010

(51) Int. Cl.
*G06F 3/01* (2006.01)
*G06F 3/00* (2006.01)

(52) U.S. Cl.
USPC .......................................... 715/702; 719/321

(58) Field of Classification Search
USPC .......................................... 715/702; 719/321
See application file for complete search history.

(56) References Cited

U.S. PATENT DOCUMENTS

| | | | | |
|---|---|---|---|---|
| 5,493,683 A * | 2/1996 | Cloud et al. | ................... | 713/320 |
| 5,745,762 A * | 4/1998 | Celi et al. | ...................... | 719/323 |
| 5,790,114 A * | 8/1998 | Geaghan et al. | ............... | 715/763 |
| 5,801,696 A * | 9/1998 | Roberts | ......................... | 715/781 |
| 5,926,775 A * | 7/1999 | Brumley et al. | ............... | 702/127 |
| 6,189,050 B1 * | 2/2001 | Sakarda | ........................... | 710/18 |
| 7,730,500 B2 * | 6/2010 | Chew et al. | .................... | 719/328 |
| 2003/0233487 A1 * | 12/2003 | Ruget et al. | .................... | 709/321 |
| 2006/0097991 A1 * | 5/2006 | Hotelling et al. | ............. | 345/173 |
| 2008/0168368 A1 * | 7/2008 | Louch et al. | ................... | 715/764 |
| 2008/0168475 A1 * | 7/2008 | de Cesare et al. | ............. | 719/321 |
| 2009/0225042 A1 * | 9/2009 | Andrews et al. | ............... | 345/173 |

* cited by examiner

*Primary Examiner* — Boris Pesin
*Assistant Examiner* — Matthew Ell

(57) ABSTRACT

An operating system providing multi-touch support for (user) applications in a mobile device. In one embodiment, a check of whether the touch screen (in the mobile device) has multi-touch capability is performed. A first interface with multi-touch capability is provided to the (user) applications if the touch screen has multi-touch capability and a second interface with single touch capability being provided if the touch screen does not have multi-touch capability. The first and second interfaces may be provided by corresponding device drivers loaded when the mobile device is initialized with the operating system. A device driver (providing the second interface) is also designed to perform the check and execute another device driver (providing the first interface) if the touch screen has multi-touch capability.

26 Claims, 5 Drawing Sheets

OPERATING SYSTEM PROVIDING MULTI-TOUCH SUPPORT FOR APPLICATIONS IN A MOBILE DEVICE

BACKGROUND

1. Technical Field

The present disclosure relates to system software and more specifically to an operating system providing multi-touch support for (user) applications in a mobile device.

2. Related Art

A mobile device commonly refers to a hand held computing device. Mobile devices, being small, often contain touch/display screens which allow users to interact with the display using one or more fingers (used synonymously with stylus type pointing implements which provide similar touch function).

Multi-touch screens (having multi-touch capability) are designed to recognize and track several simultaneous touches. For example, when a user moves her fingers in two different areas on a screen, information indicating touch/movement for both fingers is provided by a multi-touch screen. In contrast, a single/standard touch screen (having single touch capability) may recognize and track only one touch corresponding to a single finger.

Applications are implemented in systems with touch screens to provide convenient user interface based on touches from the user. The touch based interfaces are designed to elicit user inputs (e.g., yes or no, a specific value, zoom factor/direction, etc.) required during execution of an application as is well known in the relevant arts.

Interface between the (user) applications and touch screens is commonly provided by an operating system/system application (typically by what are termed as device drivers in the relevant arts), which in general receives data representing a touch from the touch screen and forwards the corresponding information to the applications in a suitable format.

Operating system is often provided by one business entity and the hardware unit of the mobile device is assembled and provided by another business entity. The operating system may contain device drivers designed for interfacing with single touch screens only, for example, because a substantial number of the hardware units contain single touch screens. Examples of such operating systems are Windows CE5, Windows CE6, Windows Mobile 5 or Windows Mobile 6 operating systems, all available from Microsoft Corporation.

However, the same operating system may be required to be installed on hardware units with multi-touch screens, for example, due to contractual or other business reasons. In such a situation, applications may not receive indications of multiple touches, even if the applications are designed for responding to multiple touches, since the device drivers in the operating system are not designed for handling multiple touches.

An approach such as replacing a single touch driver with a multi-touch driver may not be feasible since an operating system (e.g., in the operating systems from Microsoft Corporation noted above) components themselves have binding to a single touch driver. Binding implies that the design of the operating system requires loading and execution of the single-touch driver when the mobile device is initialized (e.g., powered on) with the operating system.

An operating system provided according to an aspect of the present invention overcomes such a problem, while supporting multi-touch applications, as described in sections below.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present invention, an operating system provides multi-touch support for user applications in a mobile device. In one embodiment, a check of whether a touch screen (in the mobile device) has multi-touch capability is performed. A first interface with multi-touch capability is provided to the user applications if the touch screen has multi-touch capability and a second interface with single touch capability is provided if the touch screen does not have multi-touch capability (that is, has only single touch capability).

The provision of different interfaces based on the capabilities of the touch screen facilitates the same operating system (bound to a driver providing single touch capability) to be installed onto many hardware units and to obtain the full functionality provided by the touch screen.

In one embodiment, the first and second interfaces are provided by corresponding device drivers loaded when the mobile device is initialized with the operating system. A device driver (providing the second interface for single touch support) bound to the operating system is executed on initialization. The device driver is designed to perform the above check and to execute another device driver providing the first interface for multi-touch support if the touch screen has multi-touch capability. Various resources are allocated upon such execution. As a result, unneeded allocation of resources is avoided when multi-touch support is not provided by the touch screen.

The device driver is also designed to retrieve information (indicating for each time instance, the number of touches present on the touch screen, the coordinates of each touch etc.) representing multi-touches from the touch screen and pass the retrieved information to the other device driver (providing multi-touch support). The other device driver is designed to receive and place the information in a queue and indicate to the user applications that the information is being placed in the queue, thereby enabling the user applications to retrieve and process the information representing the multiple touches.

Several aspects of the invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Mobile Device

Figure 1:
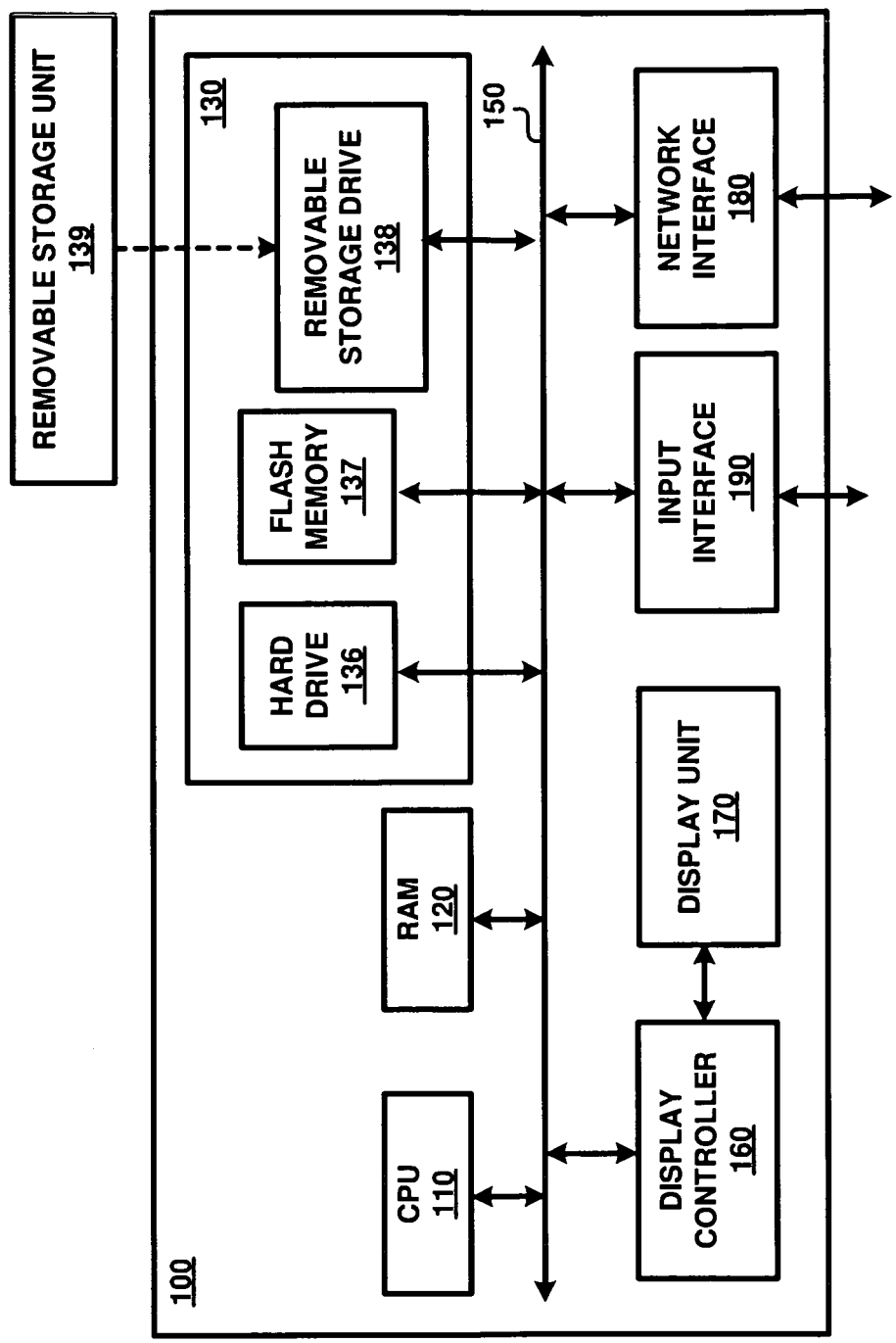
FIG. 1 is a block diagram illustrating the details of a mobile device in which several aspects of the present invention are operative by execution of appropriate software instructions.

FIG. 1 is a block diagram illustrating the details of mobile device 100 in which several aspects of the present invention are operative by execution of appropriate software instructions. Mobile device 100 may contain one or more processors such as a central processing unit (CPU) 110, random access memory (RAM) 120, secondary memory 130, display controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present invention. It should be appreciated that instructions are first loaded into RAM 120 and then executed by CPU 110. Loading implies that the instructions are linked to other objects/portions together constituting a software application (here operating system) and the linked instructions are stored in RAM 120.

The software application may contain various device drivers described in sections below. Execution thereafter entails allocation of resources (such as a portion of a RAM for storing data in the form of stack, heap, etc.), retrieving the instructions from RAM 120 and using the allocated resources in processing the retrieved instructions.

CPU 110 may contain multiple processing units, with each processing unit potentially being designed for a specific task. Alternatively, CPU 110 may contain only a single general-purpose processing unit. RAM 120 may receive instructions from secondary memory 130 using communication path 150.

Display controller 160 generates display signals (e.g., in RGB format) to display unit 170 based on data/instructions received from CPU 110. Display unit 170 contains a display screen to display the images defined by the display signals.

Display unit 170 is also designed to recognize user generated touches on the display screen and to forward the locations of the touches (hereafter referred to as touch points) to display controller 160. Display unit 170 also sends corresponding indications when the user's finger/pen touches the display screen (referred to as a "pen down" indication) and when the user's finger/pen is removed from the display screen (referred to as a "pen up" indication).

Input interface 190 may correspond to a keyboard and a pointing device (e.g., touch-pad, mouse) and may be used to provide inputs (in addition to the touches provided by the user using display unit 170). Network interface 180 provides connectivity to a network (e.g., using Internet Protocol, Wireless, GSM/CDMA technologies, etc.), and may be used to communicate with other systems.

Secondary memory 130 may contain hard drive 136, flash memory 137, and removable storage drive 138. Secondary memory 130 may store the data and software instructions, which enable mobile device 100 (CPU 110, display controller 160, etc.) to provide several features in accordance with the present invention.

Some or all of the data and instructions may be provided on removable storage unit 139, and the data and instructions may be read and provided by removable storage drive 138 to CPU 110. The secondary memory may be implemented using Flash/NAND based disks, though alternative embodiments may be based on other technologies such as floppy drive, magnetic tape drive, CD-ROM drive, DVD Drive, removable memory chip (PCMCIA Card, EPROM) as well.

Removable storage unit 139 may be implemented using medium and storage format compatible with removable storage drive 138 such that removable storage drive 138 can read the data and instructions. Thus, removable storage unit 139 includes a computer (or machine in general) readable (storage) medium having stored therein computer software and/or data. However, the computer (or machine, in general) readable medium can be in other forms (e.g., non-removable, random access, etc.).

In this document, the term "computer program product" is used to generally refer to removable storage unit 139 or hard disk installed in hard drive 136. These computer program products are means for providing software to mobile device 100. CPU 110 or graphics controller 160 may retrieve the software instructions, and execute the instructions to provide various features of the present invention described below.

The features of the invention are described with the specific problem noted in the Background Section above.

3. Operating System with Single Touch Driver

Figure 2:
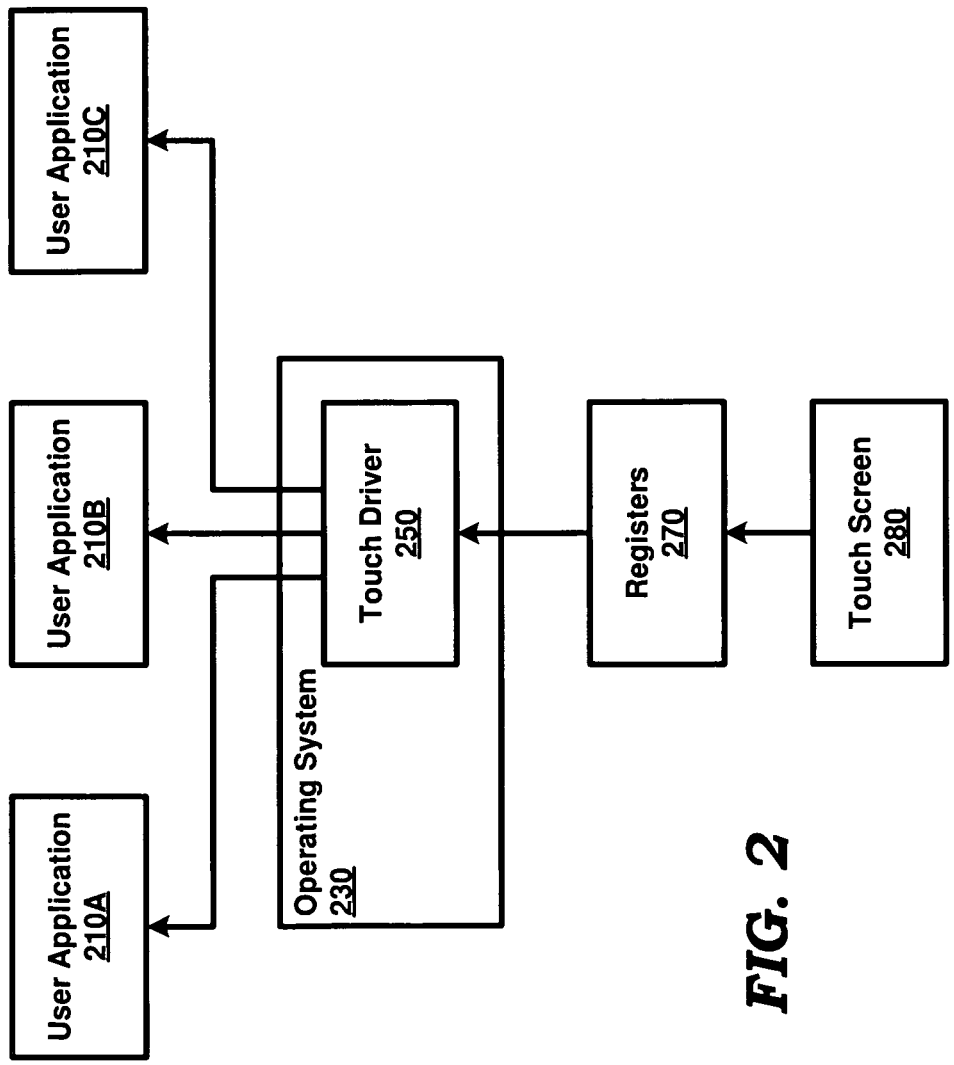
FIG. 2 is a block diagram illustrating the details of a mobile device installed with an operating system having a single touch driver in one embodiment.

FIG. 2 is a block diagram illustrating the details of a mobile device installed with an operating system having a single touch driver in one embodiment. The mobile device is shown containing user applications 210A-210C, operating system 230 (containing touch driver 250), registers 270 and touch screen 280. Each block is described in detail below.

User applications 210A-210C represents software modules which on execution are designed to perform specific tasks (requested by users). In general, several user applications are executed in the context of a run-time environment containing one or more of system applications such as operating systems (e.g. 230), virtual machines (e.g. supporting Java™ programming language), etc., as is well known in the relevant arts.

On execution, user applications 210A-210C may provide convenient user interfaces to elicit touch based user inputs. In response to the inputs provide by the user, user applications 210A-210C may perform corresponding actions/tasks. User applications 210A-210C may be designed to respond to a single touch (referred to as a single touch application) or to multiple simultaneous touches (referred to as a multi-touch application). It may be noted that multi-touch applications may also be designed to work with single touches, though the inputs (i.e., touch movements consistent with what is available from single touch technology) required from the user may be different for performing the same actions/tasks.

Operating system 230 represents a software module (or a system application) providing a common environment for execution of user applications (such as 210A-210C) while managing/coordinating the activities performed by the user applications. Operating system 230 further controls access to the hardware resources (such as touch screen 280) in the mobile device, thereby facilitating sharing of the hardware resources among executing applications. Such features with respect to hardware resource are generally accomplished by using a corresponding device driver for each hardware resource type. Operating system 230 can be implemented by extending various presently available operating systems such as Windows CE5, Windows CE6, Windows Mobile 5 or Windows Mobile 6 operating systems, all available from Microsoft Corporation.

Touch screen 280 represents a display screen capable of recognizing one or more user generated touches. Touch screen 280 can also be classified as having single or multi touch capability based on whether touch screen 280 is able to simultaneously recognize only a single user touch or multiple user generated touches. For illustration purpose, the description below is provided assuming that it is a multi-touch screen.

In response to the touches, touch screen 280 stores the pen down/up indications and the (X and Y) coordinates of the touch points corresponding to the specific user touches in registers 270. Registers 270, as is well known, represent a volatile storage providing fast access to the data maintained in the storage. Touch screen 280 may be provided as part of display unit 170 while registers 270 may be contained in display controller 160.

It may be appreciated that the information provided by touch screen 280 may be visualized as a data stream containing pen down (PD) indications, touch points in the form (X,Y) and pen up (PU) indications. An example data stream could be PD, (50, 50), PD, (100, 100), (50, 51), (101, 100), (50, 52), PU, (102, 100), PU wherein the first PD, (50, 50), (50, 51), (50, 52), and the first PU represents touch movement by a first finger and the second PD, (100, 100), (101, 100), (102, 100) and the second PU represents a touch movement by a second finger (simultaneous with the first finger).

Touch driver 250 (part of operating system 230) represents a software module providing an interface between user applications (such as 210A-210C) and touch screen 280. Touch driver 250 (upon execution) is designed to communicate with touch screen 280 through specific bus/communication subsystems, provide commands to and/or receive/send data from/to the hardware unit using registers 270, and also to provide the requisite (programming) interfaces to operating system 230 and user applications 210A-210C. Touch driver 250 may also provide interrupt handling for asynchronous time-dependent interfacing with touch screen 280. Touch driver 250 may be a necessary component of operating system 230 in view of the binding definitions present in the operating system.

In one prior approach, touch driver 250 is designed to handle only a single simultaneous touch received from touch screen 280 (that is, applications with single touch capability). When information representing multiple simultaneous touches is received from touch screen 280 (if multi-touch capable), touch driver 250 either ignores the information or processes the information related to one of the touches (typically, the first touch). Thus, for the above example data stream, touch driver 250 may forward PD, (50, 50), (50, 51), (50, 52), and PU (corresponding to the first touch) to user applications 210A-210C, while ignoring the information related to the second touch.

Accordingly, touch driver 250 is capable of supporting only single touch applications. Multi-touch (user) applications that are designed for handling multiple touches are restricted to performing actions based only on a single touch. Such a restriction may not be desirable, in particular, when touch screen 280 is multi-touch capable. As noted above, it may be appreciated that the solution of replacing touch driver 250 with another driver having multi-touch capability may not be desirable/feasible.

Several aspects of the present invention provide for making multi-touch support available to applications 210A-210C, as described below with examples.

4. Providing Multi-touch Support

Figure 3:
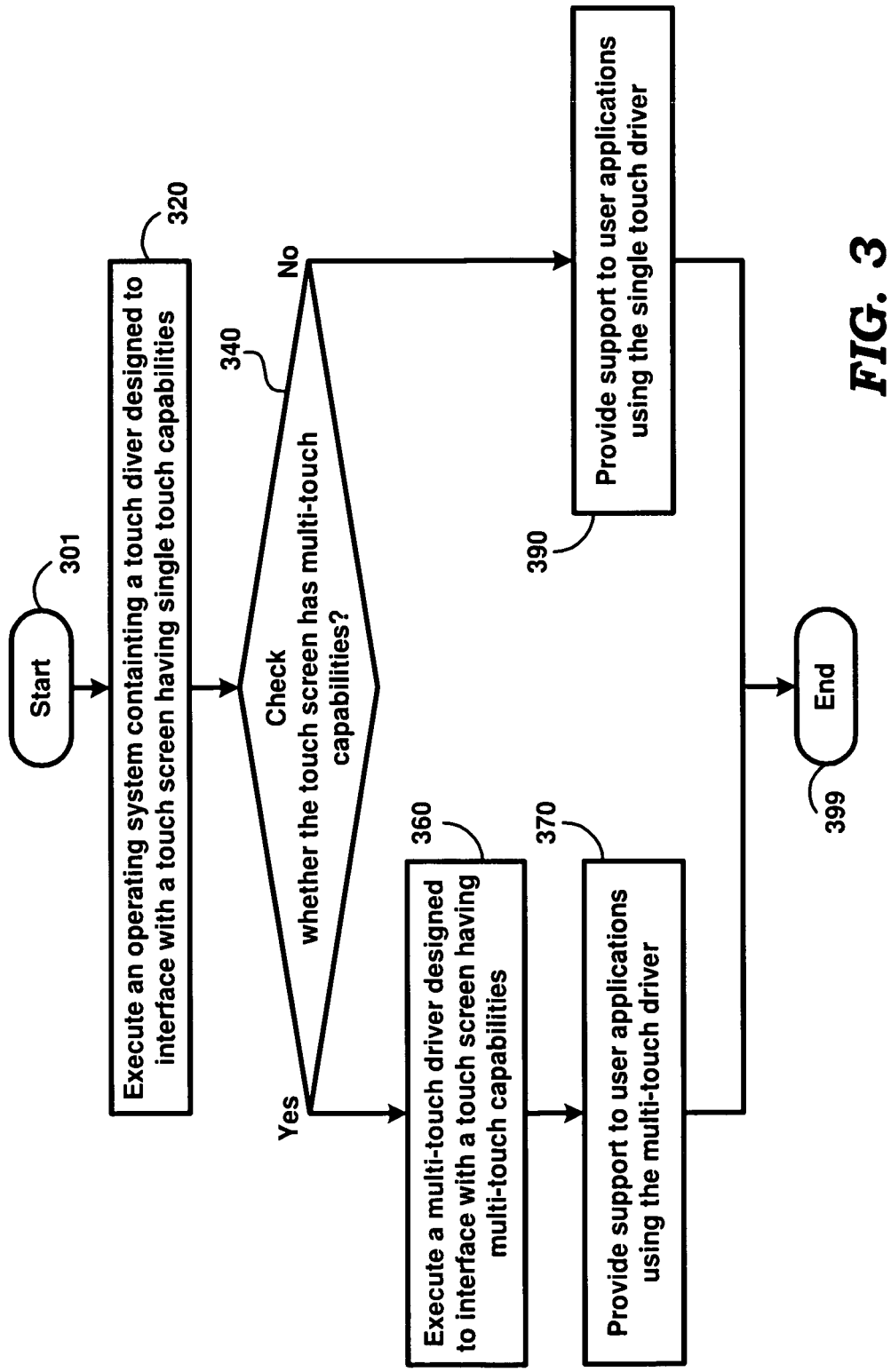
FIG. 3 is a flow chart illustrating the manner in which support for multi-touch capability is provided according to an aspect of the present invention.

FIG. 3 is a flow chart illustrating the manner in which support for multi-touch capability is provided according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 320.

In step 320, CPU 110 executes an operating system (such as 230) containing a touch driver (250) designed to interface with a touch screen having single touch capability. The operating system along with the single touch driver is capable of supporting single touch applications that may be executed in the environment/context of the operating system. Multi-touch applications may be restricted to performing actions based on a single simultaneous touch.

In step 340, CPU 110 checks whether the touch screen (in the mobile device) has multi-touch capability. The check may be performed when software instructions constituting the operating system are executed by CPU 110.

The determination may be performed based on the values specified in pre-defined registers. Alternative techniques may also be used to ascertain whether the touch screen hardware has multi-touch capability. Control passes to step 360 if the touch screen has multi-touch capability and to step 380 if the touch screen has single touch capability.

In step 360, CPU 110 executes a multi-touch driver designed to interface with a touch screen having multi-touch capability, when the touch screen is determined to be a multi-touch screen. Once executed, the multi-touch driver is ready to process the data representing multiple simultaneous touches.

In step 370, CPU 110 provides support to user applications using the multi-touch driver, thereby enabling multi-touch applications to receive information representing the multiple touches performed by the user on the touch screen and to perform appropriate actions/tasks. Control passes to step 399 where the flow chart ends.

In step 390, CPU 110 provides support to user applications using the single touch driver when the touch screen is determined to be single touch capable. Multi-touch (user) applications may be required to interface with the single touch driver (and thus operate with reduced capability to detect user actions) since the touch screen has only single touch capability. The flow chart ends in step 399.

Thus, by determining the capability of the multi-touch driver and executing a multi-touch driver only when the touch screen has multi-touch capability, the time/resource requirements are minimized while providing support to both single touch and multi-touch (user) applications in the mobile device. The touch drivers may also be designed to provide support to system applications such as other components of operating system.

The features described above can be implemented in various embodiments. The manner in which the prior approach may be modified to incorporate the features of the flowchart is described below with examples.

5. Example Implementation

Figure 4:
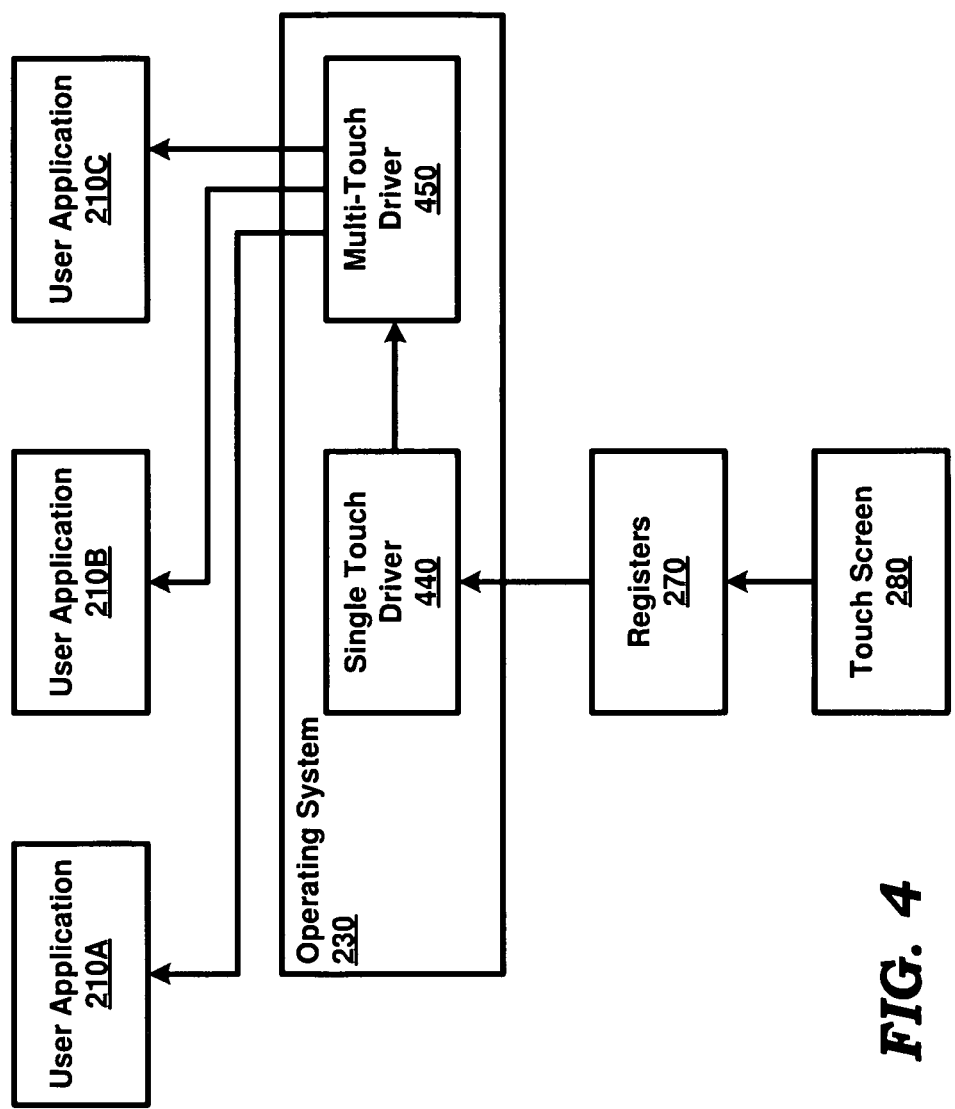
FIG. 4 is a block diagram illustrating the details of operation of device drivers provided in an embodiment of the present invention.

FIG. 4 is a block diagram illustrating the details of operation of device drivers provided in an embodiment of the present invention. Similar numbers are used to represent corresponding portions of FIGS. 2 and 4 and hence descriptions of such portions are not repeated for conciseness. However the differences/extensions are described below.

Single touch driver 440 is loaded and executed by default when the hardware unit is initialized with operating system 230. The term 'by default' implies that the device driver is loaded as an integral part of the operating system at least during normal functioning of the operating system.

Multi-touch driver 450 represents a software module providing an interface between user applications (such as 210A-210C) and touch screen 280 (when having multi-touch capability). Multi-touch driver 450 is capable of receiving and forwarding information representing multiple touches to user applications 210A-210C. Multi-touch driver 450 is also loaded along with single touch driver 440 when the hardware unit is initialized with operating system 230.

Multi-touch driver 450 contains instructions to expressly request various resources (memory space, etc., for the queues described below with respect to FIG. 5), and these instructions are caused to be executed by single touch driver 440, as described below. Due to such execution, the required resources are allocated and multi-touch driver 450 is ready to process multiple simultaneous touches received thereafter.

Single touch driver 440 is designed to check whether touch screen 280 has multi-touch capability (step 340), and operates similar to touch driver 250 in supporting single touch applications (step 390) if touch screen 280 has only single touch capability. If touch screen 280 is determined to have multi-touch capability, single touch driver 440 is designed to execute (the loaded instructions constituting) multi-touch driver 450 (step 360). In addition, single touch driver 440 is designed to retrieve (from touch screen 280) and forward (to multi-touch driver 450) the information pertaining to multiple touches.

In one embodiment, multi-touch driver 450 is designed to retrieve information representing the multiple touches from registers 270 via executing portions of single touch driver 440. Such a design would not substantially increase the resource requirements since in alternate embodiments, the executing portions would be required to be incorporated directly into multi-touch driver 450 for accessing registers 270.

Multi-touch driver 450 may receive the example data stream described above. In addition, multi-touch driver 450 retrieves (via single touch driver 440) the number of pens/fingers that are currently being used by the user. Accordingly, the modified data stream received from touch screen 280 may be visualized as Pens=1, PD, (50, 50), Pens=2, PD, (100, 100), (50, 51), (101, 100), (50, 52), PU, (102, 100), PU.

Multi-touch driver 450 may process the above modified data stream and send the following packets P1-P4 to user applications 210A-210C:

P1 {PD, (50, 50)}
P2 {PD, (50, 50), PD, (100, 100)}
P3 {PD, (50, 51), PD, (101, 100)}
P4 {PU, (50, 52), PU, (102, 100)}

It may be observed that packet P1 contains information representing a single touch (since the value of pens is 1) while packets P2, P3 and P4 contains information representing two simultaneous touches (since the value of pens is 2). Multi-touch user applications may process the packets P1 to P4 and perform appropriate actions/tasks.

Thus, operating system 230 (containing the single and multi touch drivers) provides support to single/multi-touch user applications in the mobile device by determining the capability of the touch screen and selectively loading the multi-touch driver (if the touch screen has multi-touch capability). The description is continued illustrating the manner in which a multi-touch driver is implemented in one embodiment

6. Multi-Touch Driver

Figure 5:
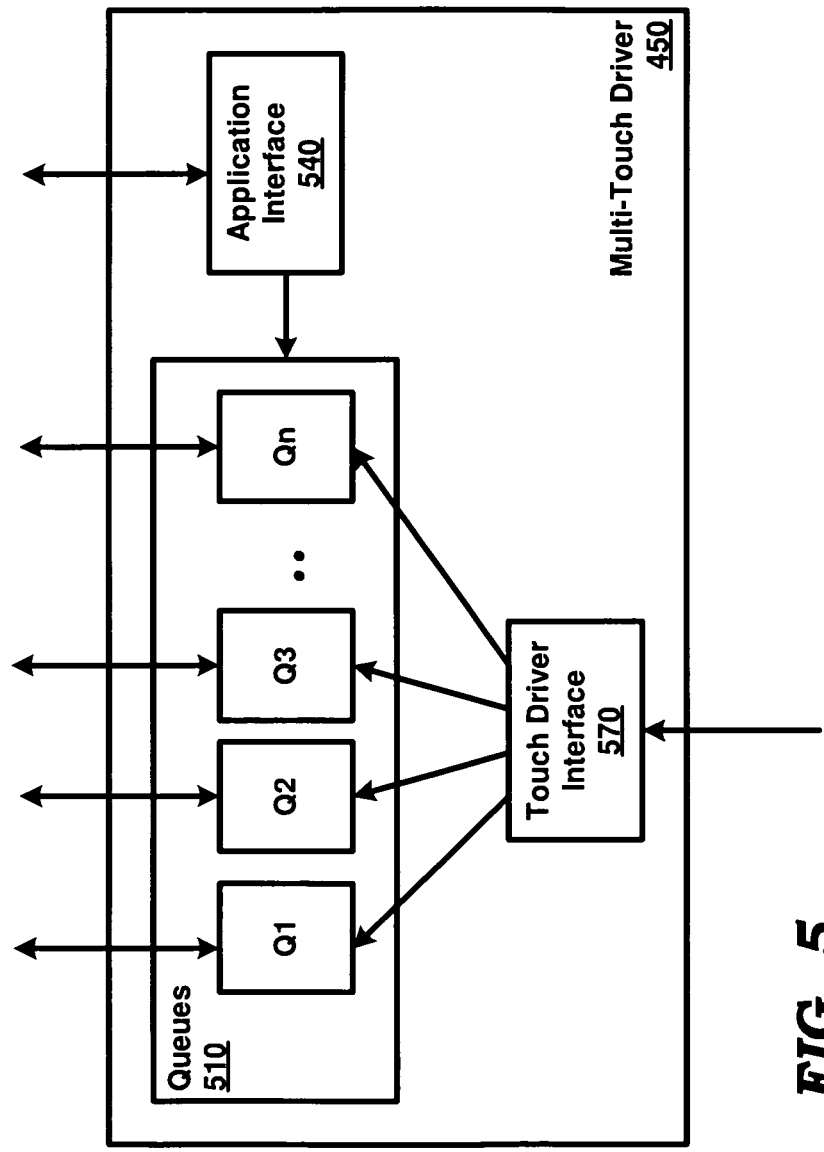
FIG. 5 is a block diagram illustrating the details of a multi-touch driver in one embodiment.

FIG. 5 is a block diagram illustrating the details of a multi-touch driver (450) in one embodiment. Multi-touch driver 450 is shown containing queues 510, application interface 540 and touch driver interface 570. Each block is described in detail below.

Queues 510 is a collection of named queues (conveniently named Q1, Q2, Q3 up to Qn) used by user applications to retrieve packets (such as P1-P4) corresponding to the multiple touches generated by a user on touch screen 280. As is well known, a queue represents a first-in-first-out (FIFO) data structure, where data is added to end of the queue while data is removed from the beginning of the queue. The resources (e.g. memory space) required for queues 510 may be allocated when multi-touch driver 450 is executed (by single touch driver 440).

Application interface 540 receives a request from a user application (such as 210A) for subscribing to multi-touch information. The request from the user application may be received using appropriate programming interfaces, as will be apparent to one skilled in the arts. Application interface 540 then creates a queue (for example, Q1) in queues 510 associated with the requesting user application and sends a response indicating the name of the created queue to the requesting user application.

User application 210A may then monitor the named queue Q1 for multi-touch information (in the form of packets). On determining that new information is available (for example, by receiving an indication from application interface 540), user application 210A retrieves the information from its associated queue Q1 (by removing from the beginning of the queue) and then processes the retrieved information. Similarly, other user (and/or system) applications may associate themselves with corresponding queues (by sending subscription requests to application interface 540) and then process the multi-touch information received in the associated queue.

Touch driver interface 570 receives information representing the multiple touches (for example, as the modified data stream described above) from touch driver 250 and then processes the received information to determine the multiple touches (in the form of packets P1-P4). Touch driver interface 570 then forwards the determined information (packets P1-P4) to each of the queues Q1, Q2, etc., created in queues 510, thereby enabling the associated user application to retrieve and process the packets.

It may be appreciated that the same packets in different queues may be processed differently based on the design of the corresponding user applications. For example, in a scenario where an operating system allows only one user application to be active (receive user inputs) at any time instance, the inactive/background applications (i.e., other than one in the front) may be designed to ignore the touch information in their corresponding queues.

Thus, the operating system (containing both the single and multi-touch drivers) described above provides multi-touch support for user applications when a multi-touch screen is present in a mobile device. In addition, single touch support is provided when the touch screen has only single-touch capability. As a result, a single operating system may be preloaded onto many hardware units, and yet obtain the full functionality provided by the touch screen as described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of supporting an user application executing in the context of an operating system, both of said user application and said operating system being provided in a mobile device with a touch screen, said method comprising:
   checking whether said touch screen has multi-touch capability when said mobile device is powered on with said operating system, said mobile device is installed with said operating system;
   providing a first interface with multi-touch capability to said user application if said touch screen has multi-touch capability and a second interface with single touch capability if said touch screen does not have multi-touch capability, said first interface being provided by loading a first device driver with said operating system, and said second interface being provided by loading a second device driver with said operating system; and
   when the touch screen has multi-touch capability, creating a plurality of queues to store information representing multi-touches from said touch screen for said user application.

2. The method of claim 1,
   wherein said second device driver is operable to perform said checking and operable to execute said first device driver for multi-touch support if said touch screen has multi-touch capability.

3. The method of claim 2, wherein said second device driver is operable to retrieve said information representing multi-touches from said touch screen from said plurality of queues and pass said information to said first device driver.

4. The method of claim 3, wherein said information is provided for each of a sequence of time instances, and wherein said information indicates, for each time instance, a number of touches present on said touch screen at the time instance and the coordinates of the locations at which the touches are present.

5. The method of claim 4, further comprising:
   indicating to said user application that said information is being placed in said plurality of queues, wherein said user application retrieves said information from said plurality of queues.

6. A non-transitory machine readable storage medium storing software instructions which can be executed by one or more processors of a mobile device operable to provide support to an user application, said software instructions comprising:
   a first set of instructions comprising a first device driver operable to interface with a touch screen if said touch screen has a multi-touch capability and to create a plurality of queues to store information representing multi-touches from said touch screen for said user application; and a second set of instructions comprising a second device driver operable to interface with said touch screen if said touch screen has a single touch capability, wherein said second set of instructions is further operable to check whether said touch screen has said multi-touch capability when said mobile device is powered on with an operating system and operable to execute said first device driver to provide support to said user application with said multi-touch capability, said mobile device is installed with said operating system.

7. The non-transitory machine readable storage medium of claim 6, further comprising loading said second device driver by default when said mobile device is powered on with said operating system.

8. The non-transitory machine readable storage medium of claim 7, wherein said second device driver is operable to retrieve an information representing multi-touches from said touch screen from said plurality of queues and pass said information to said first device driver.

9. The non-transitory machine readable storage medium of claim 8, wherein said touch screen provides information for each of a sequence of time instances, and wherein said information indicates, for each time instance, a number of touches present on said touch screen at the time instance and the coordinates of the locations at which the touches are present.

10. The non-transitory machine readable storage medium of claim 9, wherein said first device driver comprises instructions for:
   indicating to said user application that said information is being placed in said plurality of queues, wherein said user application is operable to retrieve said information from said plurality of queues.

11. A mobile device comprising:
a touch screen; and
a processor, which, upon execution of instructions is operable to:
check whether said touch screen has multi-touch capability when said mobile device is powered on with said operating system, said mobile device is installed with said operating system, and provide a first interface with multi-touch capability to an user application if said touch screen has multi-touch capability and a second interface with single touch capability if said touch screen does not have multi-touch capability, said first interface being provided by loading a first device driver with said operating system, and said second interface being provided by loading a second device driver with said operating system; and
when the touch screen has multi-touch capability, creating a plurality of queues to store information representing multi-touches from said touch screen for said user application.

12. The mobile device of claim 11,
wherein said second device driver is operable to provide said second interface, said second device driver being operable to perform said check and operable to execute said first device driver for multi-touch support if said touch screen has multi-touch capability, and wherein said first device driver is operable to provide said first interface.

13. The mobile device of claim 12, wherein said second device driver is operable to retrieve an information representing multi-touches from said touch screen and pass said information to said first device driver.

14. The mobile device of claim 13, wherein said touch screen provides information for each of a sequence of time instances, and wherein said information indicates, for each time instance, a number of touches present on said touch screen at the time instance and the coordinates of the locations at which the touches are present.

15. The mobile device of claim 14, wherein said first device driver is operable to:
indicate to said user application that said information is being placed in said queue, wherein said user application retrieves said information from said queue.

16. The mobile device of claim 15, wherein said operating system is a mobile operating system.

17. The method of claim 2, wherein said second device driver is loaded by default when said mobile device is powered on with said operating system.

18. The mobile device of claim 11, wherein said processor is further operable to:
load said second device driver by default when said mobile device is powered on with said operating system.

19. The non-transitory machine readable storage medium of claim 6, wherein said first device driver and said second device driver are powered on with said operating system.

20. The non-transitory machine readable storage medium of claim 6, wherein said first device driver is operable to retrieve information representing multiple touches via executing portions of said second device driver.

21. The method of claim 1, wherein said checking whether said touch screen has multi-touch capability comprises referencing values specified in a plurality of pre-defined registers of the mobile device.

22. The method of claim 4, further comprising:
placing said information in a plurality of registers of the mobile device; and
executing a plurality of portions of said second device driver to retrieve said information.

23. The non-transitory machine readable storage medium of claim 6, wherein said second set of instructions is operable to check whether said touch screen has said multi-touch capability by referencing values specified in a plurality of pre-defined registers of the mobile device.

24. The non-transitory machine readable storage medium, of claim 9, wherein said first device driver comprises instructions for:
executing a plurality of portions of said second device driver to retrieve said information.

25. The mobile device of claim 11, wherein said processor is operable upon execution of instructions to check whether said touch screen has multi-touch capability by referencing values specified in a plurality of pre-defined registers of the mobile device.

26. The method of claim 1, wherein said second device driver is loaded when said mobile device is powered on with said operating system.

* * * * *